(12) United States Patent
Reuschel et al.

(10) Patent No.: US 8,836,494 B2
(45) Date of Patent: Sep. 16, 2014

(54) LIGHTING DEVICE WITH ANIMATED SEQUENTIAL LIGHT FOR A MOTOR VEHICLE

(75) Inventors: Jens Dietmar Reuschel, Ingolstadt (DE); Christoph Schmitz, Abensberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/005,441

(22) PCT Filed: Mar. 14, 2012

(86) PCT No.: PCT/EP2012/001131
§ 371 (c)(1),
(2), (4) Date: Sep. 16, 2013

(87) PCT Pub. No.: WO2012/123111
PCT Pub. Date: Sep. 20, 2013

(65) Prior Publication Data
US 2014/0002254 A1 Jan. 2, 2014

(30) Foreign Application Priority Data

Mar. 17, 2011 (DE) .......................... 10 2011 014 262

(51) Int. Cl.
*B60Q 1/00* (2006.01)
*B60Q 3/04* (2006.01)
*B60Q 3/02* (2006.01)
*B60Q 1/50* (2006.01)

(52) U.S. Cl.
CPC *B60Q 1/50* (2013.01); *B60Q 3/044* (2013.01); *B60Q 3/048* (2013.01); *B60Q 3/0233* (2013.01); *B60Q 3/0293* (2013.01); *B60Q 3/0286* (2013.01)

USPC .................. 340/438; 340/426.15; 340/431

(58) Field of Classification Search
USPC ......... 340/438, 439, 435, 436, 463, 460, 471, 340/956, 426.15, 431
See application file for complete search history.

(56) References Cited

U.S. PATENT DOCUMENTS 5,993,059 A * 11/1999 O'Neill et al. ................. 374/126
6,140,934 A * 10/2000 Lam .......................... 340/815.4

(Continued)

FOREIGN PATENT DOCUMENTS

DE    298 08 949 U1    7/1998
DE    198 22 636 A1    11/1999

(Continued)

OTHER PUBLICATIONS

International Search Report issued by the European Patent Office in International Application PCT/EP2012/001131.

*Primary Examiner* — Daniel Previl
(74) *Attorney, Agent, or Firm* — Henry M Feiereisen LLC

(57) ABSTRACT

A lighting device has a first panel, which has an underside and an upper side, and a plurality of lighting elements which illuminate the first panel from the underside. The first panel has a plurality of transparent and non-transparent elements which are arranged one adjacent to the other in an alternating fashion and which each extend completely from the underside to the upper side. The lighting elements are controlled by a control device which is designed to bring about a predefinable spatial brightness profile in a space on the upper side of the first panel.

9 Claims, 2 Drawing Sheets

(56) References Cited

U.S. PATENT DOCUMENTS

Figure 4:
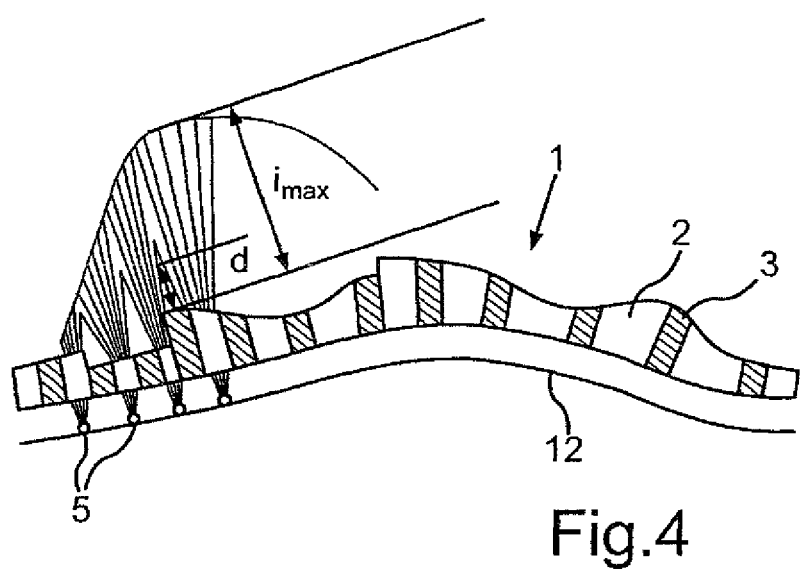

| | | | |
|---|---|---|---|
| 6,160,475 A | 12/2000 | Hornung et al. | |
| 7,501,939 B1 | 3/2009 | Belikov et al. | |
| 2004/0128882 A1 | 7/2004 | Glass | |
| 2005/0094146 A1* | 5/2005 | Hunt | 356/401 |
| 2007/0176402 A1* | 8/2007 | Irie et al. | 280/735 |
| 2010/0014711 A1* | 1/2010 | Camhi et al. | 382/104 |
| 2010/0253501 A1* | 10/2010 | Gibson | 340/475 |
| 2010/0302020 A1 | 12/2010 | Lenneman et al. | |
| 2012/0002442 A1 | 1/2012 | Brandt et al. | |

FOREIGN PATENT DOCUMENTS

| | | |
|---|---|---|
| DE | 199 04 915 A1 | 2/2001 |
| DE | 201 03 133 U1 | 7/2001 |
| DE | 10 204 359 A1 | 10/2002 |
| DE | 10 2006 009 636 A1 | 9/2007 |
| DE | 10 2007 054 348 A1 | 5/2009 |
| DE | 10 2008 064 022 A1 | 9/2009 |
| DE | 10 2009 011 948 A1 | 9/2010 |
| DE | 10 2010 017 494 A1 | 12/2011 |
| EP | 2 174 833 A2 | 4/2010 |
| WO | WO 2005009795 A2 | 2/2005 |

* cited by examiner

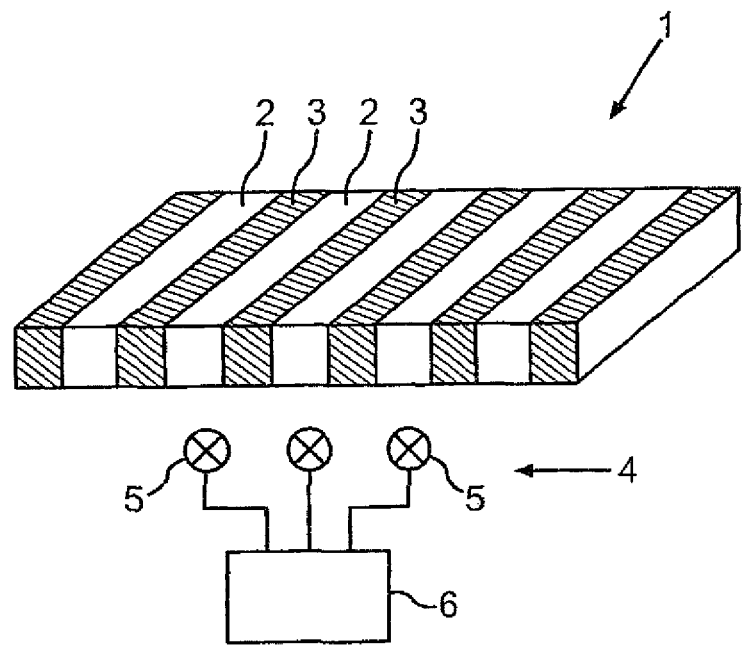
Fig.1
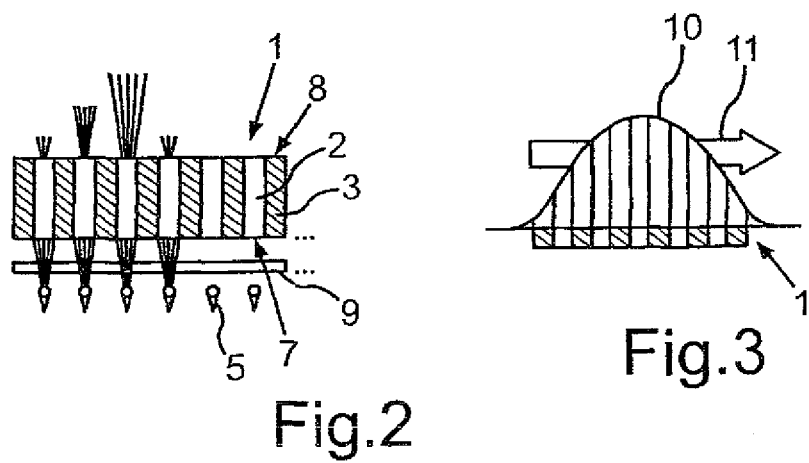
Fig.2
Fig.3

LIGHTING DEVICE WITH ANIMATED SEQUENTIAL LIGHT FOR A MOTOR VEHICLE

The present invention relates to a lighting device for a motor vehicle with a plate which has a bottom side and a topside and multiple lighting elements which eliminate the plate from the bottom side.

From DE 200 103 133 U1 a signaling for the motor vehicle field is known. The signaling device is equipped with a carrier element, which has a through-opening for generating a lettering and image representation, and/or a sequence of signs at least portions of which are flat. At a flat side, the carrier element is connected with a flat lighting unit on electroluminescence basis or lighting polymer basis or by means of illuminated acrylic glass forming a backlighting. This rule opening is filled with the filling mass in particular a pouring matrix, which is at least partially permeable.

For illuminating the interior, motor vehicles usually have multiple lights or lighting devices. In most cases these are small lamps, which can be switched on or off. However, they do not additionally serve to carry information, which the vehicle occupant could visually perceive.

Higher-end vehicles in addition have numerous monitoring devices or driver assist systems. These produce warning signals, which are oftentimes visually displayed. In most cases, warning lights are provided for this purpose in the interior of the vehicle. These warning lights are often configured as purely technical elements and conflict with an aesthetically pleasing overall impression of the vehicle interior.

The object of the present invention is thus to provide a lighting device with which the interior of the vehicle cannot only be illuminated but in addition items of information can also be conveyed to a vehicle occupant.

According to the invention, this object is solved by a lighting device for a motor vehicle with
  a first plate which has a bottom side and a topside, and
  multiple lighting elements, wherein
    the first plate has multiple transparent and nontransparent elements which are arranged in alternating succession adjacent one another, and which respectively reach entirely from the bottom side to the top side, and
    the lighting elements are controlled by a control device, and the control device is configured to achieve a predeterminable local brightness profile in a space on the topside of the first plate.

The term brightness profile is here used synonymously with the term intensity profile.

Advantageously, a lighting device can thus be realized which in the non-illuminated state as a high decorative value. In the illuminated state the transparent and nontransparent elements result in an inhomogeneous light effect with which information can be conveyed by the imposed brightness profile. When this light effect is also animated or moved, this results in a harmoniously perceived light experience.

In an embodiment, at least two of the lighting elements can emit different colors. This means that different color effects can be achieved with the lighting device. For example the lighting elements of a first color can be controlled differently than the lighting elements of a second color. As an alternative, the differently colored lighting elements can also be operated combined or simultaneously. This allows providing items of information to a vehicle occupant also via the color.

In addition, the light intensity of the individual lighting elements or of multiple lighting elements can be varied with the control device. This allows generating more harmonious light impressions. In addition information can also be relayed to the occupant by means of the light intensity.

In a further embodiment, the control device has an input for receiving a sensor signal and the lighting elements can be controlled in dependence on the sensor signal. Thus, vehicle external parameters or vehicle internal parameters can be determined via corresponding sensor systems and transmitted to the control device. Vehicle external parameters can for example include the distance to further traffic participants or the speed of other objects. Examples for vehicle internal parameters are the speed, the rotational speed, the steering angle, the setting of the blinker and the like. With all these parameters the lighting elements can be controlled via the control device.

The lighting elements can also be controlled with a control device so that multiple of the lighting elements cause a continuous intensity profile ranging between the intensity zero and a predeterminable maximal value. This continuous intensity profile can be understood in terms of space as well as time. In a spatially continuous intensity profile, the intensity increases continuously from one lighting element to the next. In a temporally continuous intensity profile, the intensity of a single lighting element slowly increases for example depending on the time.

The lighting elements can also be controlled with the control device so that a wave-shaped intensity profile of the light that is emitted by the lighting elements results. In this case it is then particularly advantageous when a predetermined intensity profile of the light emitted by the lighting elements moves in a direction in which the lighting elements are arranged in temporal succession. This allows realizing an animated sequential light, which leads to a harmonious light impression when the intensity profile for example corresponds to a Gauss curve.

In a particular embodiment, a partially transparent second plate can be arranged between the multiple lighting elements and the first plate. This serves the purpose that the light of the lighting elements is scattered before it enters the layered first plate, which is situated there above. This has the effect that the lighting device is perceived as less punctiform and as the case may be multiple transparent strips are illuminated by the same lighting element.

It is particularly advantageous when a driver assist system for a motor vehicle is equipped with such a lighting device. It is for example useful to arrange the lighting device with or without control device in the door of the motor vehicle.

In the following, invention is explained in more detail by way of the included drawings, which shown in:
  FIG. 1 a schematic representation of a lighting device according to the present invention;
  FIG. 2 a cross-section of a further embodiment of the lighting device,
  FIG. 3 an intensity profile on a linear lighting device, and
  FIG. 4 an intensity profile of a curved lighting device.

The exemplary embodiments, which are explained in more detail in the following, are preferred embodiments of the present invention.

A motor vehicle has in its interior for example an ambient light. This ambient light serves for illuminating the interior of the vehicle comfortably and in an aesthetically pleasing manner. A portion of the ambient lighting can for example be accommodated in the door of the motor vehicle. Other parts of the lighting can be arranged at the ceiling of the motor vehicle, at the center console or at other sites of the interior of the vehicle. High-quality ambient light is characterized in that on one hand excellent brightness in the sub-regions of the interior of the vehicle is ensured and on the other hand the light source is not directly recognizable as such.

According to the present invention such an ambient light with multiple lighting elements and a special decor plate is provided. This provides a high-quality lighting element in the illuminated state and in the non-illuminated state a high-quality decor element.

According to the example of FIG. 1, the lighting device has a first plate 1, which in cross section has multiple alternating transparent and nontransparent elements. In the present example, the transparent elements are formed by transparent strips 2 made of a transparent material and the nontransparent regions are formed by nontransparent strips 3 from a nontransparent material. The individual strips 2, 3 each form a layer and protrude in each case entirely from the top side of the first plate to the bottom side.

The layers or strips 2, 3 are non-detachably interconnected. For example they are fixedly glued to each other. The stacking direction of the layers extends in this case perpendicularly to the topside of the plate. However, the stacking direction can also extend at an angle obliquely to the topside of the plate. Important is only that a lighting device 4 which is located on the bottom side of the first plate 1 can shine through the transparent elements onto the other side of the plate 1.

The nontransparent elements or strips 3 can for example be produced from wood. However, they can also be made of a metal for example aluminum or steel.

The transparent strips 2 can be partially transparent or fully transparent. They are for example made of PMMA or another plastic.

The strips 2, 3, which are joined to the plate 1 can each have the same layer thickness (parallel to the topside of the plate). However, the strips 2, 3 can also have different widths. Thus the transparent strips 2 can be thicker than the nontransparent strips 3 or vice versa. In addition, the transparent strips 3 do not have to be formed all from the same material. For example one nontransparent strip 3 can be made from wood and the adjacent or closest nontransparent strip 3 can be made from aluminum.

In a further exemplary embodiment, two nontransparent strips 3 are located respectively between two transparent strips 2. One of these intermediate nontransparent strips 3 can for example be made of wood and the other from a metal. Regarding the layering or the succession in which the strips 2, 3 are placed next to each other, any combinations of layer thickness, material and succession are possible.

The first plate 1 is here illuminated by a lighting device 4. The lighting device 4 has multiple lighting elements 5. Each of these lighting elements 5 is controlled by a control device 6. The control device 6 controls the lighting elements 5 so that these light up and thereby transmit information for illumination purposes or as part of assistance function to warn the vehicle occupant in response to a defined situation. For this the control device 6 has a signal input, which is not shown in FIG. 1. Together with the lighting elements 5 the control device 6 can thus support or realize a lighting or warning function.

In the example of FIG. 1 the lighting elements 5 are located in each case directly below a transparent element or strip 2. This means that each lighting element 5 is assigned to exactly one single transparent strip 2. This does not exclude however to also assign multiple transparent strips 2 or elements to each lighting element 5. It is also not necessary that a lighting element 5 is assigned to each strip 2.

FIG. 2 shows a section through the first plate 1 of FIG. 1. The transparent and nontransparent layers, i.e., here the transparent strips 2 and the nontransparent strips 3 can be recognized. The transparent strips 2 and the nontransparent strips 3 reach entirely from the bottom side 7 to the topside 8 of the first plate 1. Between the lighting elements 5 and the plate 1 here the second plate 9 is located. This second plate 9 is either partially transparent or entirely transparent in its interior with roughened surface (and with this also partially transparent). Preferably, it is partially transparent and with this this non-see-through. In this way the individual lighting elements 5 cannot be perceived from the outside by an observer. Thus, even when the transparent strips 2 are fully transparent, the partially transparent plate 7 prevents that the lighting elements 5 can be optically recognized or exactly localized.

As can be seen from FIG. 2 a lighting element 5 in the operating condition shines light through the second plate 9 where the light is scattered. The scattered light then permeates a transparent strip 2 of the plate 1 and then exits towards the outside for example into the interior of the vehicle.

In the example of FIG. 2 each transparent strip 2 i.e., each transparent layer is assigned one lighting element 5. However multiple transparent strips 2 can also be assigned to one lighting element 5.

In the example of FIG. 2 the plate 1 is shown with only relatively few transparent and nontransparent elements. The individual elements in the direction parallel to the plate surface 8 have for example a thickness of 2 to 3 mm. Overall the plate 1 can for example extend over a greater lining section of a motor vehicle door. However, the plate can also be configured very longitudinally and can extend for example in longitudinal direction of the vehicle along the entire ceiling of the interior of the vehicle for example as lighting strip.

The above exemplary embodiments all have transparent and nontransparent strips or layers. Instead of the strips 2, 3 the plate 1 can also be formed from other geometric bodies or elements. For example it can be formed by polygonal prisms or cylinders, which completely extend from the bottom side to the topside of the plate. The interspaces between the prisms or cylinders are then for example made from a nontransparent material.

FIG. 2 indicates that not all lighting elements light up with the same intensity. With the control device 6, the intensity of each individual lighting element 5 can be individually controlled. In particular the intensity and depending on the circumstance also the light color (for example in the case of a multicolored LED) can be varied. The individual lighting elements 5 are either individual light sources (for example LEDs) or LED groups or bands and may be controlled to represent different light profiles or intensity profiles.

In the example of FIG. 3 a snapshot of an intensity profile 10 across a plate 1 is schematically shown. At a defined time point the shown intensity distribution is thus positioned at the defined site of the plate 1. Concretely, the intensity distribution 10 can for example correspond approximately to a Gauss distribution or a normal distribution.

The lighting elements 5 of the lighting device according to the invention are controlled in such a manner that the intensity distribution 10 moves temporally for example in the direction 11 which is drawn in in FIG. 3 parallel to the arrangement of the lighting elements 5. With this a sequential light is created having very harmonious flanks. In principle the flanks of the intensity distribution can also be very steep when the corresponding lighting elements 5 are only switched on and off i.e., the intensity is only varied in a binary manner. With this a running like can also be realized by corresponding temporal control of the lighting elements.

In this way a sequential light can for example be generated which moves along the inside of a door for example in driving direction or against the driving direction. This can indicate to the driver that for example a bicyclist approaches from the rear (cf. the driver assist systems described below). In this example the control device would have received a corresponding sensor signal from the radar sensor for controlling the lighting elements that signals the passing or the presence of a bicyclist.

The control device 6 for controlling the lighting elements 5 can be coupled with one or more vehicle sensors for triggering or controlling an animated sequential light. However, it can also be coupled for example with one or multiple cameras, which for example can detect a takeover maneuver.

As a result of the nontransparent layers 3, the light is perceived as inhomogeneous by an observer. However, as a result of the continuity of the wave course corresponding to the example of FIG. 3 a harmonious impression is created.

The plates 1 in the above examples is always shown even and flat. However the plate 1 does not have to be flat but can rather be curved on the bottom side as well as on the topside as exemplary shown in FIG. 4. For example the plate 1 has a strip-shaped form and extends along a curved inner contour 12 of a vehicle door or a vehicle ceiling. When a defined brightness profile or a defined intensity distribution 10 is desired, the control device 6 has to take the contour of the plate 1 into account. In order to achieve the desired intensity distribution the layer thicknesses i.e., suitable thicknesses of the transparent elements 2 and the nontransparent elements 3 (i.e., the transparent and from transparent layers) can also be selected. Depending on the width of the individual layers, a homogenous light impression then results in a distance of more than d. Across multiple layers or elements 2, 3 the intensity has for example the maximal value $i_{max}$. In the sequential light the contour of the plate 1 is then always to be taken into account for the actual control of the lighting elements.

In the case of danger the light of the lighting elements can be turned on or switched either completely or in groups. In particular the color can be changed in the case of danger.

A lighting device with targeted inhomogeneous but harmonious illumination can thus be realized. In spite of the nontransparent sections in the decor plate, a desired brightness profile can be set and an animated sequential light can even be provided. In particular the lighting device can also fulfill a warning function.

The warning function can be realized in that the control device checks a signal. When the signal satisfies a predetermined condition the control device controls a lighting device provided therefore. The lighting device is constructed in the way described before.

Warning functions are particularly useful for driver assist systems as already mentioned above. Thus the above lighting device can for example be used for a distance warner. The distance warner continuously checks whether a defined distance to the car driving in front is maintained. The verification is implemented by means of radar. When the distance falls below a minimal distance, the driver has to be warned appropriately. This can for example be achieved by means of the described lighting device below the windshield, at the dashboard or the like.

The lighting device according to the invention can also be used for a driver assist system "take over warner". In this case a radar beam scans for example the rear region of the motor vehicle. When an overtaking vehicle is detected and the own vehicle has set the blinker to the lane of the overtaking vehicle or a steering angle of the own car in the direction of the lane of the overtaking vehicle is detected, a corresponding takeover warning can be optically outputted. This occurs for example in that a sequential light on the inside of the door on the side of the overtaking vehicle indicates a take over maneuver. For example by using a red sequential light, which moves forward in driving direction.

A further application of the lighting device according to the invention in a driver assist system is its use in an "exiting assistant". When the vehicle stops for exampled next to a bicycle lane and a passenger intends to exit, a corresponding illumination of the door can indicate whether the door can be opened safely. When there is no danger the door can for example be illuminated in green inside while it is illuminated in red (optionally animated) when a bicyclist approaches or passes.

Other driver assist systems can be equipped with the lighting device according to the invention. The lighting surface can have a very large surface because it functions as highly decorative element when not in use.

The invention claimed is:

1. A lighting device for a motor vehicle comprising:
a first plate having a bottom side and a topside and multiple transparent and nontransparent elements arranged in alternating succession and extending from the bottom side to the top side;
multiple lighting elements;
a partially transparent second plate arranged between the multiple lighting elements and the first plate; and
a control device controlling the lighting elements and configured to achieve a predeterminable local intensity profile in a space on the topside of the first plate.

2. The lighting device of claim 1, wherein the control device controls the lighting elements so as to achieve a running light effect with the lighting elements.

3. The lighting device of claim 1, wherein the control device is constructed for changing a light intensity or color of individual ones of the lighting elements or of multiple ones of the lighting elements.

4. The lighting device of claim 1, wherein the control device has an input for receiving a sensor signal, and the lighting elements are controllable in dependence on the sensor signal.

5. The lighting device of claim 1, wherein the control device is constructed to control the lighting elements so that multiple of the lighting elements cause a continuous intensity profile between the intensity zero and a predeterminable maximal value.

6. The lighting device of claim 1, wherein the control device is constructed to control the lighting elements so that a wave shaped intensity profile results from the light that is emitted by the lighting elements.

7. The lighting device of claim 1, wherein control device is constructed to control the lighting elements so that a predeterminable intensity profile of light emitted by the lighting elements temporally moves in a direction in which the lighting elements are arranged.

8. A driver assist system comprising the lighting device of claim 1, said lighting device being constructed for generating an optically perceivable warning.

9. A motor vehicle comprising the driver assist system of claim 8, wherein the lighting device is arranged in a door or on a ceiling of the motor vehicle.

* * * * *